United States Patent
Gao et al.

(10) Patent No.: US 10,643,643 B1
(45) Date of Patent: May 5, 2020

(54) SPIN TORQUE OSCILLATOR DEVICE INCLUDING A HIGH DAMPING FIELD GENERATION LAYER OR A DAMPING ENHANCING CAPPING LAYER

(71) Applicant: Western Digital Technologies, Inc., San Jose, CA (US)

(72) Inventors: Zheng Gao, San Jose, CA (US); James Mac Freitag, Sunnyvale, CA (US); Susumu Okamura, Fujisawa (JP)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/358,310

(22) Filed: Mar. 19, 2019

Related U.S. Application Data

(60) Provisional application No. 62/795,884, filed on Jan. 23, 2019.

(51) Int. Cl.

| | |
|---|---|
| *G11B 5/23* | (2006.01) |
| *G11B 5/235* | (2006.01) |
| *G11B 5/31* | (2006.01) |
| *G11B 5/00* | (2006.01) |

(52) U.S. Cl.
CPC ........... *G11B 5/235* (2013.01); *G11B 5/3146* (2013.01); *G11B 2005/0024* (2013.01)

(58) Field of Classification Search
CPC .............. G11B 5/235; G11B 5/3146; G11B 2005/0024
USPC .................. 360/125.1–125.5, 125.31–125.35
See application file for complete search history.

(56) References Cited

U.S. PATENT DOCUMENTS

| | | | |
|---|---|---|---|
| 8,400,734 B2 | 3/2013 | Yamada et al. | |
| 8,445,979 B2 * | 5/2013 | Oh .................. | B82Y 25/00 257/421 |
| 8,472,140 B2 * | 6/2013 | Yamada ............. | B82Y 25/00 360/125.3 |
| 8,488,373 B2 | 7/2013 | Zhang et al. | |
| 8,582,240 B1 | 11/2013 | Chen et al. | |

(Continued)

FOREIGN PATENT DOCUMENTS

| | | |
|---|---|---|
| CN | 104835510 B | 11/2017 |
| JP | 2013251042 A | 12/2013 |
| WO | 2015126326 A1 | 8/2015 |

OTHER PUBLICATIONS

Kanai, Yasushi et al, "Micromagnetic Model Analysis of Spin-Transfer Torque Oscillator and Write Heads for Mircrowave-Assisted Magnetic Recording" IEEE Transactions on Magnetics; vol. 53, Issue 2; Feb. 2017 (11 pages).

(Continued)

*Primary Examiner* — Allen T Cao
(74) *Attorney, Agent, or Firm* — Patterson & Sheridan, LLP; Steven Versteeg

(57) ABSTRACT

Embodiments of the present disclosure generally relate to a spin torque oscillator device (STO) including a high damping field generation layer or a damping enhancing capping layer for use in microwave assisted magnetic recording (MAMR) write heads. In one embodiment, a STO device for a MAMR write head includes a spin polarization layer, a spacer layer over the spin polarization layer, and a field generation layer over the spacer layer. The field generation layer has a damping in a range from about 0.5% to about 20%.

20 Claims, 9 Drawing Sheets

(56) References Cited

U.S. PATENT DOCUMENTS

| | | | |
|---|---|---|---|
| 8,658,292 B1* | 2/2014 | Mallary | G11B 5/66 428/828 |
| 9,105,279 B2 | 8/2015 | Shiroishi | |
| 9,230,571 B1* | 1/2016 | Chen | G11B 5/314 |
| 9,275,672 B2 | 3/2016 | Shiroishi et al. | |
| 9,355,654 B1* | 5/2016 | Mallary | G11B 5/1278 |
| 9,368,135 B2 | 6/2016 | Gao | |
| 9,378,759 B2 | 6/2016 | Nagasaka et al. | |
| 9,558,765 B2 | 1/2017 | Zhang et al. | |
| 9,881,637 B1 | 1/2018 | Wilson et al. | |
| 10,032,470 B1* | 7/2018 | Degawa | G11B 5/3133 |
| 10,109,302 B1* | 10/2018 | Shinohara | G11B 5/1278 |
| 10,121,497 B1* | 11/2018 | Takahashi | G11B 5/1278 |
| 10,186,284 B2 | 1/2019 | Narita et al. | |
| 10,236,021 B2 | 3/2019 | Narita et al. | |
| 10,276,193 B2 | 4/2019 | Narita et al. | |
| 10,325,618 B1 | 6/2019 | Wu et al. | |
| 10,366,714 B1 | 7/2019 | Olson et al. | |
| 2008/0165454 A1* | 7/2008 | Kajiyama | G11C 11/16 360/324.2 |
| 2008/0291573 A1* | 11/2008 | Murakami | B82Y 10/00 360/135 |
| 2008/0304176 A1 | 12/2008 | Takagishi et al. | |
| 2009/0059423 A1 | 3/2009 | Yamada et al. | |
| 2009/0257151 A1* | 10/2009 | Zhang | G01R 33/098 360/324.2 |
| 2009/0310244 A1 | 12/2009 | Shimazawa et al. | |
| 2012/0113540 A1 | 5/2012 | Zhang et al. | |
| 2012/0154952 A1* | 6/2012 | Yamada | B82Y 25/00 360/125.12 |
| 2013/0250456 A1 | 9/2013 | Yamada et al. | |
| 2014/0104724 A1* | 4/2014 | Shiroishi | G11B 5/66 360/75 |
| 2014/0139952 A1 | 5/2014 | Takeo et al. | |
| 2014/0177100 A1 | 6/2014 | Sugiyama et al. | |
| 2015/0174574 A1* | 6/2015 | Chang | B01L 3/502715 204/451 |
| 2015/0310881 A1* | 10/2015 | Koui | G11B 5/314 360/235.4 |
| 2016/0027455 A1 | 1/2016 | Kudo et al. | |
| 2017/0148474 A1* | 5/2017 | Okamura | G11B 5/3146 |
| 2017/0178705 A1* | 6/2017 | Buhrman | H01L 43/08 |
| 2017/0236537 A1 | 8/2017 | Murakami et al. | |
| 2018/0033954 A1* | 2/2018 | Aradhya | H01L 43/06 |
| 2018/0268848 A1 | 9/2018 | Narita et al. | |
| 2019/0081606 A1* | 3/2019 | Yamane | H03H 2/00 |
| 2019/0088274 A1 | 3/2019 | Narita et al. | |

OTHER PUBLICATIONS

Mallary, Mike et al.; "Head and Media Challenges for 3 Tb/in2 Microwave-Assisted Magnetic Recording" IEEE Transactions on Magnetics, vol. 50, No. 7, Jul. 2014 (8 pages).

* cited by examiner

SPIN TORQUE OSCILLATOR DEVICE INCLUDING A HIGH DAMPING FIELD GENERATION LAYER OR A DAMPING ENHANCING CAPPING LAYER

CROSS-REFERENCE TO RELATED APPLICATIONS

This application claims benefit of U.S. Provisional Patent Application Ser. No. 62/795,884, filed Jan. 23, 2019, which is herein incorporated by reference.

BACKGROUND OF THE DISCLOSURE

Field of the Disclosure

Embodiments of the present disclosure generally relate to a spin torque oscillator device including a high damping field generation layer or a damping enhancing capping layer for use in microwave assisted magnetic recording (MAMR) write heads.

Description of the Related Art

The heart of the functioning and capability of a computer is the storing and writing of data to a data storage device, such as a hard disk drive (HDD). The volume of data processed by a computer is increasing rapidly. There is a need for higher recording density of a magnetic recording medium to increase the function and the capability of a computer.

In order to achieve higher recording densities, such as recording densities exceeding 1 Tbit/in$^2$ for a magnetic recording medium, the width and pitch of write tracks are narrowed, and thus the corresponding magnetically recorded bits encoded in each write track is narrowed. One challenge in narrowing the width and pitch of write tracks is decreasing a surface area of a main pole of the magnetic write head at an air bearing surface of the recording medium. As the main pole becomes smaller, the recording field becomes smaller as well, limiting the effectiveness of the magnetic write head.

Heat-assisted magnetic recording (HAMR) and microwave assisted magnetic recording (MAMR) are two types of energy-assisted recording technology to improve the recording density of a magnetic recording medium, such as a HDD. In MAMR, an oscillation element or device is located next to or near the write element in order to produce a high-frequency magnetic field, such as in a microwave frequency band. The high-frequency magnetic field (in addition to a recording magnetic field emanated from a main pole of the write element) reduces an effective coercivity of a magnetic recording medium used to store data and allows writing of the magnetic recording medium at lower magnetic fields emanated from the write pole. Thus, higher recording density of the magnetic recording medium may be achieved by MAMR technology. There is a need in the art to improve the production processes of MAMR write heads.

SUMMARY OF THE DISCLOSURE

Embodiments of the present disclosure generally relate to a spin torque oscillator device (STO) including a high damping field generation layer or a damping enhancing capping layer for use in microwave assisted magnetic recording (MAMR) write heads.

In one embodiment, a STO device for a MAMR write head includes a spin polarization layer, a spacer layer over the spin polarization layer, and a field generation layer over the spacer layer. The field generation layer has a damping in a range from about 0.5% to about 20%.

In another embodiment, a STO device for a MAMR write head includes a spin polarization layer over the seed layer, a spacer layer over the spin polarization layer, and a field generation layer over the spacer layer. The field generation layer includes one or more magnetic layers along with one or more rare earth metal layers or one or more heavy metal layers. The field generation layer has a damping in a range from about 0.5% to about 20%.

In still another embodiment, a STO device for a MAMR write head includes a spin polarization layer, a spacer layer over the spin polarization layer, a field generation layer over the spacer layer. The field generation layer may be a high damping magnetic alloy layer, a high damping multi-layer structure, or combinations thereof. A damping enhancing capping layer is on the field generation layer. The field generation layer has a damping in a range from about 0.5% to about 20%.

In still yet another embodiment, a STO device for a MAMR write head includes a spin polarization layer means for imparting a spin torque and a field generation means generating a high-frequency magnetic field. The field generation means has a damping in a range from about 0.5% to about 20%.

BRIEF DESCRIPTION OF THE DRAWINGS

So that the manner in which the above recited features of the present disclosure can be understood in detail, a more particular description of the disclosure, briefly summarized above, is in reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

Figure 1:
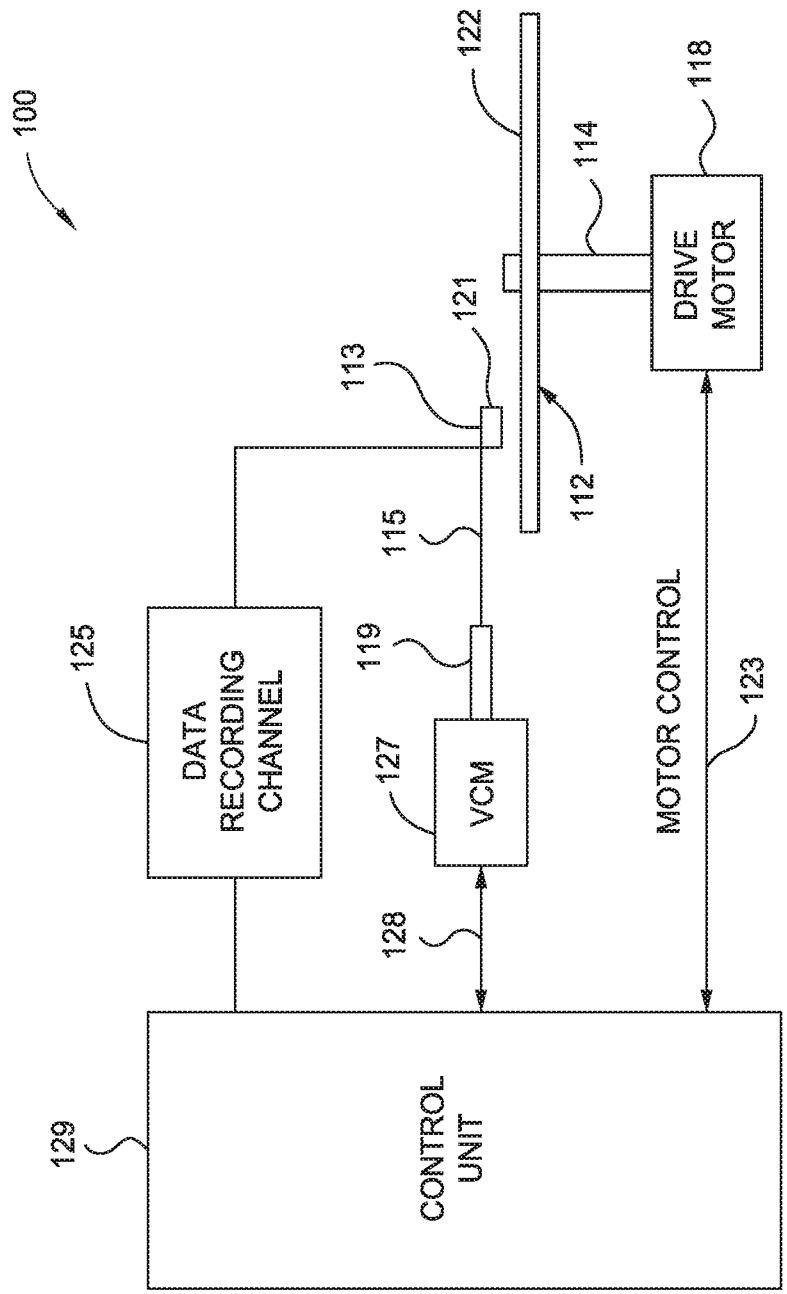
FIG. 1 is a schematic illustration of certain embodiments of a magnetic media drive including a write head.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The terms "over," "under," "between," "on", and other similar terms as used herein refer to a relative position of one layer with respect to other layers. As such, for example, one layer disposed over or under another layer may be directly in contact with the other layer or may have one or more intervening layers. Moreover, one layer disposed between layers may be directly in contact with the two layers or may have one or more intervening layers. In contrast, a first layer "on" a second layer is in contact with the second layer. The relative position of the terms does not define or limit the layers to a vector space orientation of the layers.

The term "comprises/comprising" includes the subset meaning of "consists/consisting essentially of" and includes the subset meaning of "consists/consisting of."

Certain embodiments comprise a spin torque oscillator (STO) device for a microwave assisted magnetic recording (MAMR) write head. A spin polarization layer is over a main pole of the MAMR write head. A spacer layer is over the spin polarization layer. A field generation layer (FGL) is over the spacer layer. In one embodiment, the FGL is a high damping FGL comprising a high damping magnetic alloy layer. In another embodiment, the FGL is a high damping FGL comprising a high damping multi-layer structuring including one or more magnetic layers and one or more rare earth and/or heavy metal layers. In still another embodiment, the STO device further includes a damping enhancing capping layer over the FGL.

Certain embodiments provide a microwave assisted magnetic recording write head with a spin torque oscillator (STO) device including a high damping field generation layer (FGL) or a damping enhancing capping layer. High damping in the FGL enhances amplitude of STO oscillation and/or increases coherent oscillation or rotation of the magnetization of the FGL. Without high damping in the FGL, oscillation of the magnetization of the STO device is difficult to detect, especially for STO devices with relatively large FGL volume. In certain embodiments, high damping in the FGL is provided by a rare earth metal or a heavy metal doped or laminated in the FGL while maintaining a relatively high magnetic moment (Bs) of the FGL. In certain embodiments, high damping in the FGL is provided by a damping enhancing capping layer on the FGL while maintaining a relatively high magnetic moment (Bs) of the FGL. In certain embodiments, a high damping in the FGL is used in combination with a higher magnetic flux density of a spin polarization layer (SPL) to inject spin torque into the high damping FGL to produce coherent oscillation of magnetization of the high damping FGL.

FIG. 1 is a schematic illustration of certain embodiments of a magnetic media drive including a magnetic write head, such as a MAMR head. Such magnetic media drive may be a single drive/device or comprise multiple drives/devices. For the ease of illustration, a single disk drive 100 is shown according to one embodiment. The disk drive 100 includes at least one rotatable magnetic disk 112 supported on a spindle 114 and rotated by a drive motor 118. The magnetic recording on each magnetic disk 112 is in the form of any suitable patterns of data tracks, such as annular patterns of concentric data tracks (not shown) on the magnetic disk 112.

At least one slider 113 is positioned near the magnetic disk 112. Each slider 113 supports a head assembly 121 including one or more read/write heads, such as a MAMR head including a STO device. As the magnetic disk 112 rotates, the slider 113 moves radially in and out over the disk surface 122 so that the head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic disk 112 generates an air bearing between the slider 113 and the disk surface 122 which exerts an upward force or lift on the slider 113. The air bearing thus counterbalances the slight spring force of suspension 115 and supports slider 113 off and slightly above the disk surface 122 by a small, substantially constant spacing during normal operation.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from the head assembly 121 by way of recording channel 125. Certain embodiments of a magnetic media drive of FIG. 1 may further include a plurality of media, or disks, a plurality of actuators, and/or a plurality number of sliders.

Figure 2:
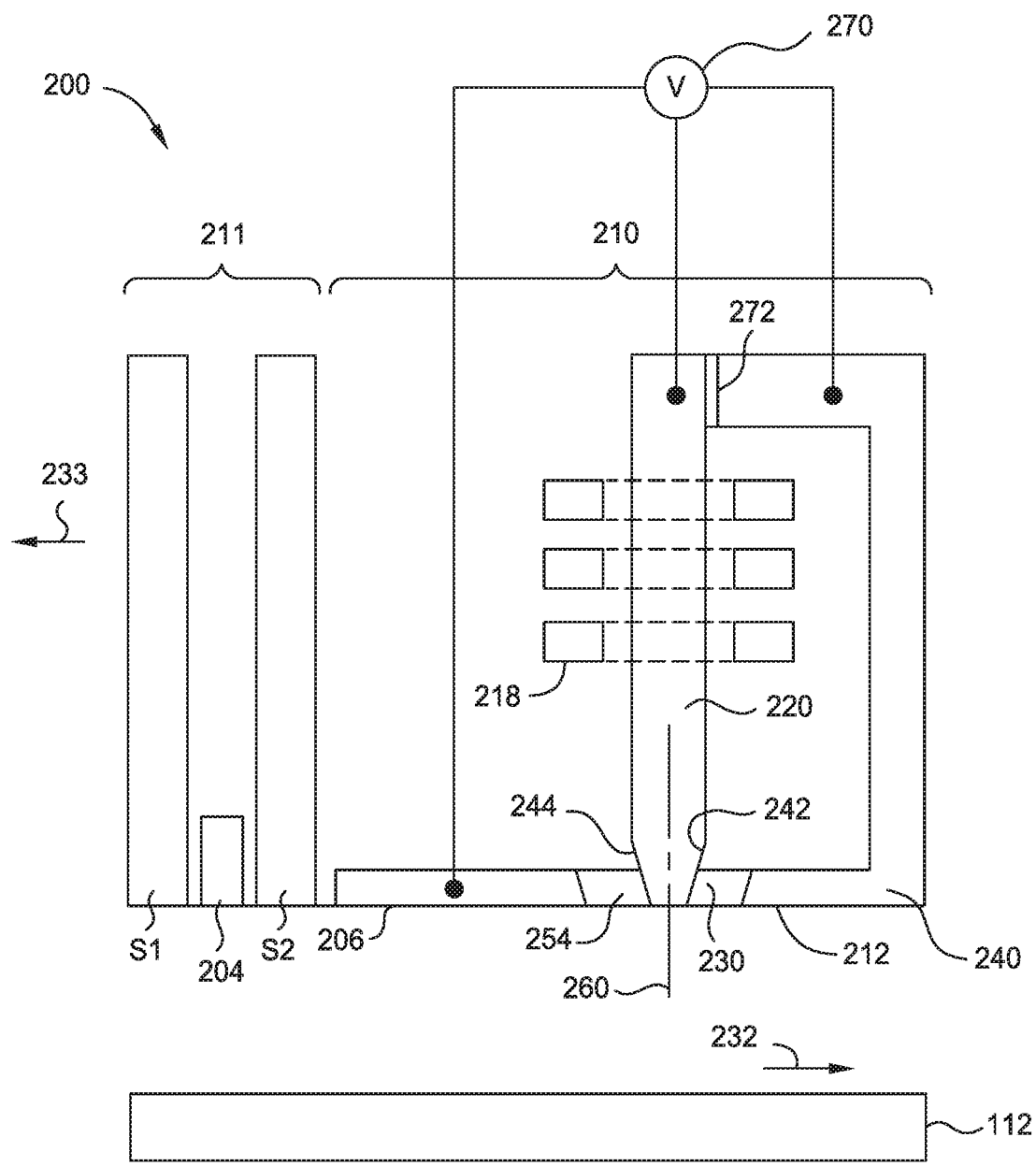
FIG. 2 is a schematic illustration of certain embodiments of a cross sectional side view of a head assembly facing a magnetic disk.

FIG. 2 is a schematic illustration of certain embodiments of a cross sectional side view of a head assembly 200 facing the magnetic disk 112. The head assembly 200 may correspond to the head assembly 121 described in FIG. 1. The head assembly 200 includes a media facing surface (MFS) 212, such as an air bearing surface (ABS), facing the disk 112. As shown in FIG. 2, the magnetic disk 112 relatively moves in the direction indicated by the arrow 232 and the head assembly 200 relatively moves in the direction indicated by the arrow 233.

In some embodiments, the head assembly 200 includes a magnetic read head 211. The magnetic read head 211 may include a sensing element 204 disposed between shields S1 and S2. In certain embodiments, the sensing element 204 is a magnetoresistive (MR) sensing element, such an element exerting a tunneling magneto-resistive (TMR) effect, a magneto-resistance (GMR) effect, an extraordinary magneto-Resistive (EMR) effect, or a spin torque oscillator (STO) effect. The magnetic fields of magnetized regions in the magnetic disk 112, such as perpendicular recorded bits or longitudinal recorded bits, are detectable by the sensing element 204 as the recorded bits.

The head assembly 200 includes a MAMR write head 210. In certain embodiments, the MAMR write head 210 includes a main pole 220, a leading shield 206, a trailing shield 240, and a spin torque oscillator (STO) device 230 disposed between the main pole 220 and the trailing shield 240. The main pole 220 serves as a first electrode and has a front portion at the ABS.

The main pole 220 comprises a magnetic material, such as CoFe, CoFeNi, or FeNi, other suitable magnetic materials. In certain embodiments, the main pole 220 comprises small grains of magnetic materials in a random texture, such as body-centered cubic (BCC) materials formed in a random texture. For example, a random texture of the main pole 220 may be formed by electrodeposition. The MAMR write head 210 includes a coil 218 around the main pole 220 that excites the main pole 220 producing a writing magnetic field structures for affecting a magnetic medium of the rotatable magnetic disk 112. The coil 218 may be a helical structure or one or more sets of pancake structures.

In certain embodiments, the main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree or different degree of taper with respect to a longitudinal axis 260 of the main pole 220. In some embodiments, the main pole 220 does not include the trailing taper 242 and the leading taper 244. Instead, the main pole 220 includes a trailing side (not shown) and a leading side (not shown) in which the trailing side and the leading side are substantially parallel.

The trailing shield 240 is a magnetic material, such as CoFe, CoFeNi, FeNi, or other suitable magnetic materials, serving as a second electrode and return pole for the main pole 220. The leading shield 206 may provide electromagnetic shielding and is separated from the main pole 220 by a leading gap 254.

The STO device 230 is positioned proximate the main pole 220 and reduces the coercive force of the magnetic medium, so that smaller recording fields can be used to record data. An electron current is applied to STO device 230 from a power source 270 to produce a microwave field. The electron current may be a direct current (DC) waveforms, pulsed DC waveforms, and/or pulsed current waveforms going to positive and negative voltages. The STO device 230 may be electrically coupled to the main pole 220 and the trailing shield 240 in which the main pole 220 and the trailing shield are separated by an insulating layer 272. The power source 270 may provide electron current to the STO device 230 through the main pole 220 and the trailing shield 240. For direct current or pulsed current, the power source 270 may flow electron current from the main pole 220 through the STO device 230 to the trailing shield 240 or may flow electron current from the trailing shield 240 through the STO device 230 to the main pole 220 depending on the orientation of the STO device 230. In other embodiments, the STO device 230 may be coupled to electrical leads providing an electron current other than from the main pole and/or the trailing shield.

Figure 3:
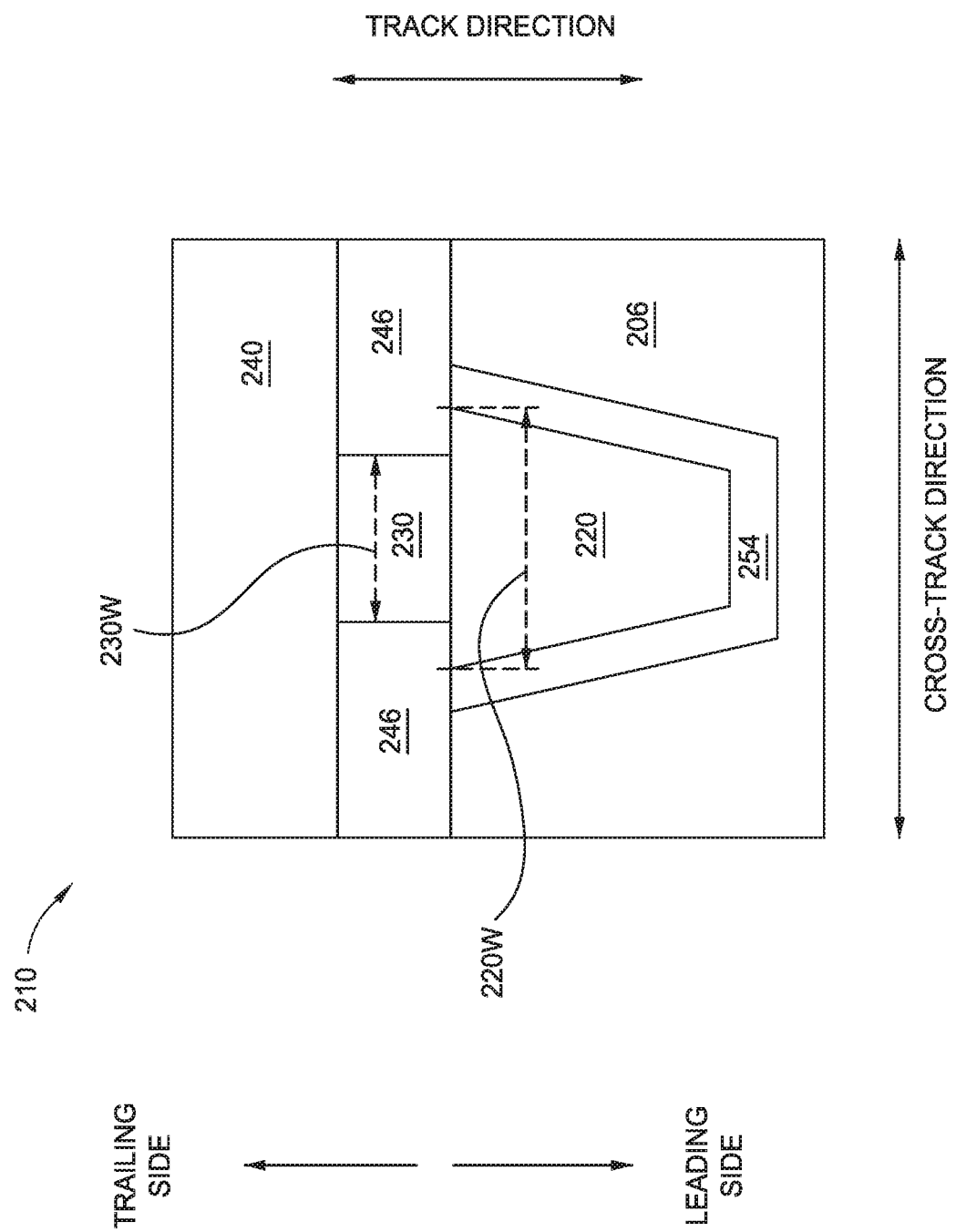
FIG. 3 is a schematic illustration of certain embodiments of a plan view of a media facing surface of a MAMR head of FIG. 2 with a spin torque oscillator (STO) device between a main pole and a trailing shield in a track direction.

FIG. 3 is a schematic illustration of certain embodiments of a plan view of a media facing surface of the MAMR write head 210 of FIG. 2 with a STO device 230 between a main pole 220 and a trailing shield 240 in the track direction. The main pole 220 of the write head 210 may be any suitable shape (i.e., trapezoidal, triangular, etc.) and suitable dimensions. The STO device 230 may be formed to any suitable shape, any suitable dimension, and any suitable position between the main pole 220 and the trailing shield 240. For example, the width 230W of the STO device 230 may be greater than, equal to, or less than the width 220W of the main pole 220 at the interface with the STO device 230.

The leading shield 206 may be positioned on one or more sides of the main pole 220 with the leading gap 254 therebetween. A side gap 246 may be positioned on the sides of the STO device 230. The side gap 246 may comprise an insulating material.

FIGS. 4A-4D are schematic plan views of media facing surfaces of certain embodiments of a STO device 230 comprising a high damping FGL 450. The STO device 230 may be part of the MAMR write head 210 of FIG. 2, FIG. 3, and/or other MAMR write heads.

Figure 4A:
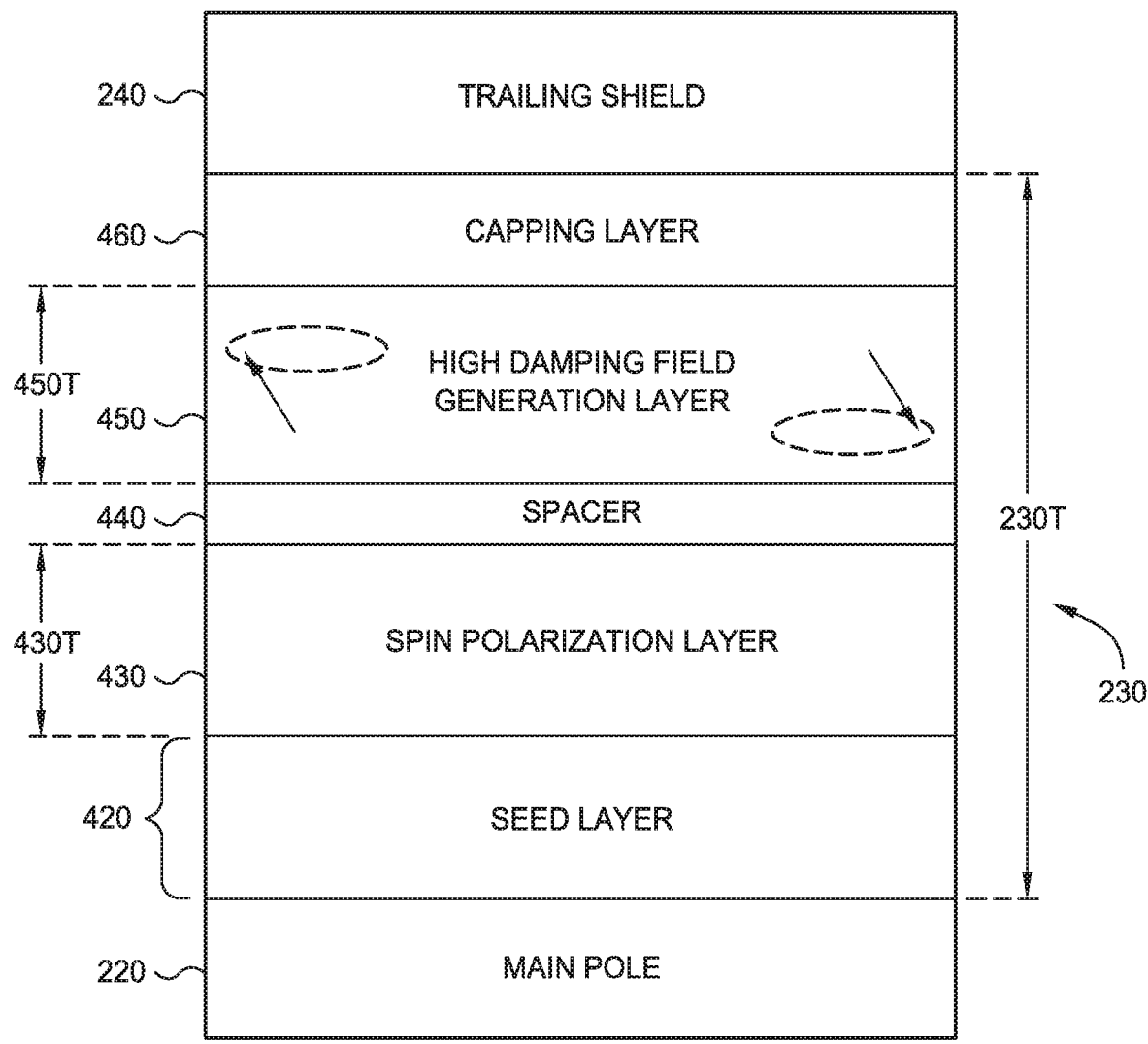
FIGS. 4A-4D are schematic plan views of media facing surfaces of certain embodiments of a STO device comprising a high damping field generation layer (FGL).

As shown in FIG. 4A, the STO device 230 is positioned proximate the main pole 220 and reduces the coercive force of the magnetic medium, so that smaller recording fields can be used to record data. A bias current applied to the STO device 230 from the power source 270 of FIG. 2 produces an assisting write magnetic field, such as a microwave field. The bias current may be direct current (DC) waveforms, pulsed DC waveforms, pulsed current waveforms going to positive and negative voltages, or other suitable waveforms.

In certain embodiments, the STO device 230 includes a seed layer 420 over or on the main pole 220, a spin polarization layer (SPL) 430 over or on the seed layer 420, a spacer layer 440 over or on the SPL 430, a high damping field generation layer (FGL) 450 over or on the spacer layer 440, and a capping layer 460 over or on the high damping FGL 450.

In certain embodiments, the seed layer 420 comprises ruthenium, copper, tantalum, other non-magnetic materials, alloys thereof, or multiple layers thereof. In certain embodiments, the seed layer 420 resets or provides a texture break for the growth of the SPL 430 over the seed layer 420 for highly textured SPL 430 with low structural defects. Low structural defects of the SPL 430 results in the SPL 430 with more magnetic homogeneity, lower critical current for reversal of the SPL 430, and better yield in the formation of the SPL 430. For example, a seed layer comprising tantalum over copper provides a nano-crystalline structure formed over the random texture of the main pole 220. The nano-crystalline structure provides a smooth surface for formation of structured layers or crystalline layers thereover with low structure/crystal defects. In certain embodiments, the seed layer 420 provides a surface for good growth of structured and/or crystalline layers such, such as face centered cubic (FCC) metal alloys, body center cubic (BCC) metal alloys, and ordered phase alloys. For example, a seed layer 420 comprising ruthenium has a hexagonal close packed structure. The hexagonal close packed (HCP) structure provides a good template surface for growth or interfacing with a FCC layer, a BCC layer, or a Heusler layer with low structural defects.

In certain embodiments, the SPL 430 comprises NiFe, CoFe, CoFeNi, CoMnGe, NiCo, NiFeCu, CoFeMnGe, CoMnSi, CoFeSi, other soft or hard ferromagnetic materials, other Heusler alloys, other suitable magnetic layers, or multiple layers thereof. The SPL 430 can comprise a material having magnetic anisotropy oriented in any general direction, such as perpendicular, angled, or longitudinal, to the plane of the magnetic disk 112 of FIG. 2 or other magnetic recording medium. The SPL 430 transmits spin torque to the high damping FGL 450 causing oscillation of the magnetization of the high damping FGL 450 to generate a high-frequency magnetic field, such as a microwave field, at high velocity close to the plane of the magnetic disk 112.

The STO device 230 comprises a spacer layer 440 between the SPL 430 and the high damping FGL 450. The spacer layer 440 includes one or more non-magnetic conductive materials with long spin diffusion length, such as Au, Ag, Al, Cu, AgSn, NiAl, other non-magnetic conductive materials, alloys thereof, or multiple layers thereof. The spacer layer 440 may reduce exchange coupling between the SPL 430 and the high damping FGL 450. The spacer layer 440 may be made of a material having a high spin transmissivity for spin torque transfer from the SPL 430 to the high damping FGL 450.

The high damping FGL 450 has a Gilbert damping coefficient α (referred to herein as "damping") in a range from about 0.5% to about 20%, such as in a range from 1.5% to about 10%. An FGL having a damping of less than 0.5% is undesirable since magnetization of the FGL may not oscillate coherently resulting in a low or undetectable amplitude of oscillation, especially when the SPL layer is thicker. The FGL may oscillate in multiple domains, random domains, or may not oscillate at all. An FGL having a damping of more than 20% is undesirable since increased high bias voltage is required to cause oscillation of the magnetization of the FGL.

The damping in a magnetic system (a thin film, multilayer stack, or structure device) is a physical property of the magnetic system. The damping in the FGL of a STO device is determined by isolating the FGL or by creating a like sample of the FGL and measuring the damping in the isolated FGL or like sample of the FGL by ferromagnetic resonance (FMR) measurements at 20° C. utilizing a PhaseFMR tool available from NanOsc Instruments AB located in Kista, Sweden.

In certain embodiments, a capping layer 460 may be on or over the high damping FGL 450 between the high damping FGL 450 and the trailing shield 240. The capping layer 460 may comprise one or more non-magnetic conductive materials. In certain embodiments, the capping layer 460 protects the STO device 230 during formation of the STO device and formation of the magnetic write head 210, such as during deposition, annealing, patterning, cleaning, etc.

Figure 4B:
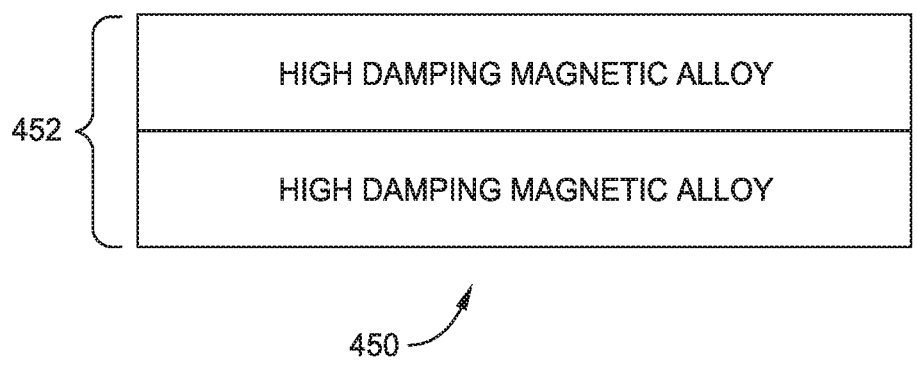

As shown in FIG. 4B, in certain embodiments, the high damping FGL 450 comprises one or more high damping magnetic alloy layers 452. Each high damping magnetic alloy layer 452 comprises a magnetic material doped with a rare earth metal and/or a heavy metal. Magnetic materials include Fe, Co, FeCo, NiFe, CoFeAl, CoFeGe, CoMnGe, CoFeSi, CoMnSi, and other magnetic materials. In certain embodiments, the high damping FGL 450 comprises a ferromagnetic material having a high moment and high spin polarization, such as FeCo and FeCo alloys. CoCr and ColrHo are disfavored since these materials have a low moment and a low spin polarization.

Rare earth metals include holmium (Ho), dysprosium (Dy), terbium (Tb), samarium (Sm), other rare earth metals, or combinations thereof. Particular examples of a high damping magnetic alloy layer 452 with a rare earth metal include FeCoHo, FeCoDy, FeCoTb, and FeCoSm. The damping in the FGL is impacted by certain magnetic materials in combination with certain doping materials. In certain embodiments, the high damping magnetic alloy layer 452 comprises an atomic percent content of a rare earth metal in a range from about 0.3% to about 10%, such as in a range from 0.5% to about 6%, to achieve a damping in a range from about 0.5% to about 20%, such as about 1.5% to about 10%. A high damping magnetic alloy layer having a rare earth metal content of greater than 10% may be undesirable since the rare earth metal content reduces the magnetic moment (Bs) of the FGL reducing the assisting write field strength and/or causes the FGL to be susceptible to corrosion during manufacture and/or during operation. A high damping magnetic alloy layer having a rare earth metal content of less than 0.3% may be undesirable since a certain damping may not be achieved.

Heavy metals include platinum (Pt), palladium (Pd), iridium (Ir), rhodium (Rh), ruthenium (Ru), rhenium (Re), osmium (Os), tantalum (Ta), hafnium (Hf), other heavy metals, or combinations thereof. The heavy metal content does not increase the susceptibility of the high damping FGL 450 to corrosion. Particular examples of a high damping magnetic alloy layer with a heavy metal include FeCoIr, FeCoPt, FeCoPd, and FeCoOs. The damping in the FGL is impacted by certain magnetic materials in combination with certain doping materials. It is believed that Os has a higher damping effect in the FGL than Ir, Pt, Pd, Ta, Hf, which all have a similar damping effect. In certain embodiments, the high damping magnetic alloy layer 452 comprises an atomic percent content of a heavy metal in a range from about 1% to about 20%, such as in a range from about 2% to about 12% to achieve a damping in a range from about 0.5% to about 20%, such as about 1.5% to about 10%. A high damping magnetic alloy layer having a heavy metal content of less than 1% may be undesirable since a certain damping may not be achieved.

In certain embodiments, a high damping magnetic alloy layer 452 is formed from physical vapor deposition of a sputtering target. The film as deposited could have a slightly less atomic percent content of rare earth metal and/or heavy metal than the sputtering target.

Figure 4C:
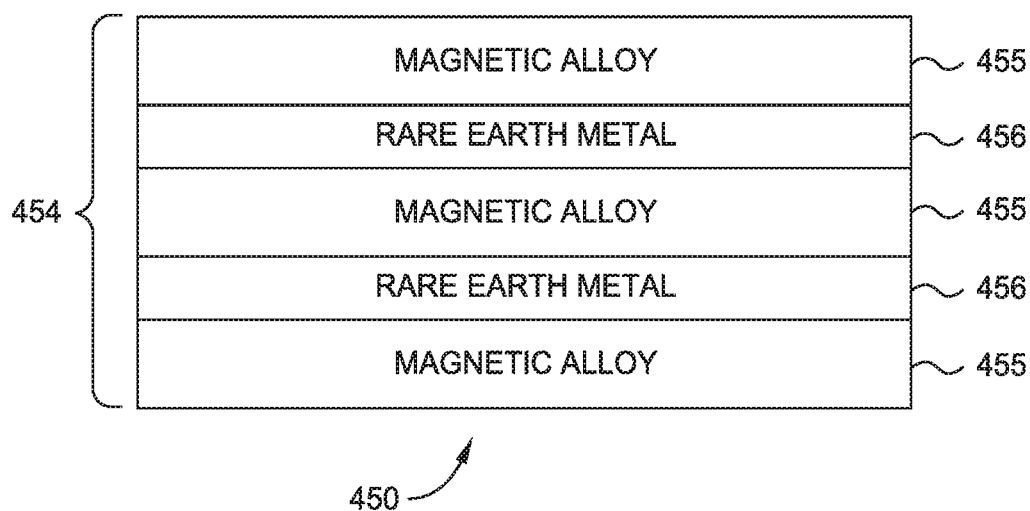

As shown in FIG. 4C, in certain embodiments, the high damping FGL 450 comprises a high damping multi-layer structure 454 comprising one or more magnetic alloy layers 455 and one or more rare earth metal layers 456 with the same or various compositions laminated or deposited over each other, such as by physical vapor deposition and/or electrodeposition. Each rare earth metal layer 456 may individually include Ho, Dy, Tb, Sm, other rare earth metals, or combinations thereof. In certain embodiments, the rare earth metal layer 456 comprises an atomic percent content of a rare earth metal in a range from about 95% to 100%, such as about 99% to 100%. The magnetic alloy layer 455 may comprise Fe, Co, FeCo, NiFe, CoFeAl, CoFeGe, CoMnGe, CoFeSi, CoMnSi and other magnetic materials. In certain embodiments, the multi-layer structure 454 comprises a total atomic percent content of a rare earth metal in a range from about 0.3% to about 10%, such as in a range from 0.5% to about 6%, to achieve a damping in a range from about 0.5% to about 20%, such as about 1.5% to about 10%. A multi-layer structure having a rare earth metal content of greater than 10% may be undesirable since the rare earth metal content reduces the magnetic moment (Bs) of the FGL reducing the assisting write field strength and/or causes the FGL to be susceptible to corrosion during manufacture and/or during operation. A multi-layer structure having a rare earth metal content of less than 0.3% may be undesirable since a certain damping may not be achieved.

Figure 4D:
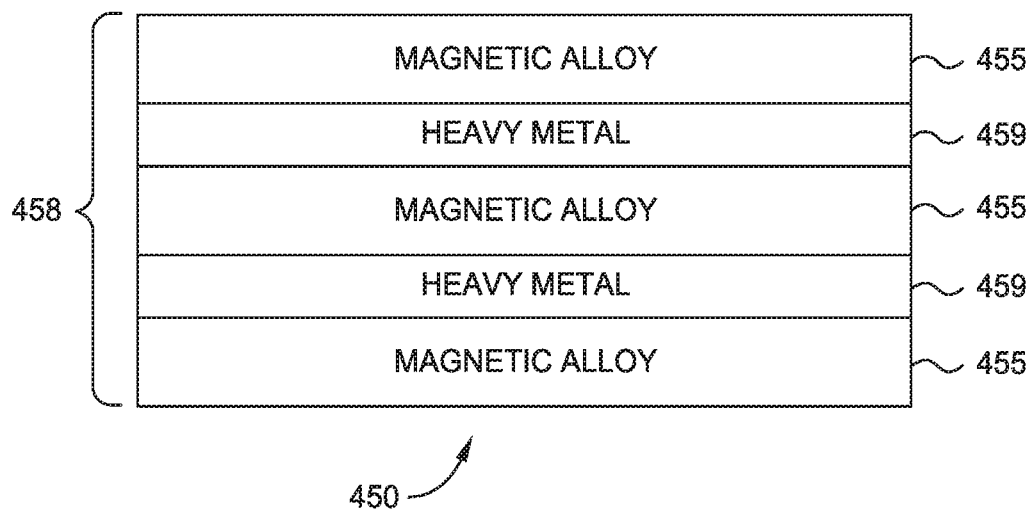

As shown in FIG. 4D, in certain embodiments, the high damping FGL 450 comprises a high damping multi-layer structure 458 including one or more magnetic alloy layers 455 and one or more heavy metal layers 459 with the same or various compositions laminated or deposited over each other, such as by physical vapor deposition and/or electrodeposition. Each heavy metal layer 459 may individually include Pt, Pd, Ir, Rh, Ru, Re, Os, Ta, Hf, other heavy metals, or combinations thereof. It is believed that a heavy metal layer 459 of Os has a higher damping effect in the FGL than a heavy metal layer 459 of Ir, Pt, Pd, Ta, Hf, which all have a similar damping effect. In certain embodiments, the multi-layer structure 458 comprises a total atomic percent content of a heavy metal in a range from about 1% to about 20%, such as in a range from about 2% to about 12% to achieve a damping in a range from about 0.5% to about 20%, such as about 1.5% to about 10%. A multi-layer structure having a heavy metal content of less than 1% may be undesirable since a certain damping may not be achieved.

In certain embodiments, a heavy metal layer 459 comprises an atomic percent content of a heavy metal in a range from about 95% to 100%, such as about 99% to 100%. The magnetic alloy layer 455 may comprise Fe, Co, FeCo, NiFe, CoFeAl, CoFeGe, CoMnGe, CoFeSi, CoMnSi and other magnetic materials.

Spin torque transmitted from the SPL 430 to the high damping FGL 450 of FIGS. 4A-D causes oscillation of the magnetization of the high damping FGL 450 generating a high-frequency magnetic field, such as a microwave field. The high damping FGL 450 may be one or more high damping magnetic alloy layers 452 as shown in FIG. 4B, may be one or more magnetic alloy layers 455 and one or more metal rare earth metal layers 456 as shown in FIG. 4C, may be one or more magnetic alloy layers 455 and one or more metal rare earth metal layers 456 as shown in FIG. 4C, one or more magnetic alloy layers 455 and one or more heavy metal layers 459 as shown in FIG. 4D, or combinations thereof. For example, the high damping FGL 450 may be a multi-layer structure comprising one more high damping magnetic alloy layers 452, one or more magnetic alloy layers 455, one or more metal rare earth metal layers 456, and/or one or more heavy metal layers 459.

An electron current is applied to STO device 230 from a power source 270 to produce a microwave field. The STO device 230 may be electrically coupled to the main pole 220 and the trailing shield 240 in which the main pole 220 and the trailing shield are separated by an insulating layer 272. The power source 270 may provide electron current to the STO device 230 through the main pole 220 and the trailing shield 240. The power source 270 may flow electron current from the main pole 220 through the STO device 230 to the trailing shield 240 or may flow electron current from the trailing shield 240 through the STO device 230 to the main pole 220 depending on a configuration of the STO stack structure of a SPL and a FGL locations between the main pole and trailing shield. In other embodiments, the STO device 230 may be coupled to other electrical leads providing an electron current flow separate from the main pole and/or the trailing shield.

When an electron current flows through the STO device 230 through the SPL 430, the electrons passing through the SPL 430 are polarized. The stream of polarized electrons from the SPL 430 to the high damping FGL 450 imparts a spin torque to the high damping FGL 450 causing the FGL 450 to emit a high-frequency magnetic field to the magnetic recording medium reducing the coercive force of the recording medium and reducing the switch field threshold. The recording magnetic field applied from the main pole 220 to the STO device 230 influences the magnetization direction of the high damping FGL 450 so that the high damping FGL 450 can oscillate to produce a microwave field. The magnetization direction of the SPL 430 and the high damping FGL 450 can be the same or can be different depending on the STO device. The magnetization direction of the high damping FGL 450 is reversed depending on the magnetization direction of the recording magnetic field. Reversal of the high damping FGL 450 establishes a consistent microwave field to the magnetic recording medium.

In certain embodiments, oscillation of the magnetization of the high damping FGL 450 from the spin torque from the SPL 430 is more coherent. The oscillation frequencies of the spectrum of the magnetic field emitted from the high damping FGL 450 forms a sharp peak that is easy to detect. A sharp peak is defined in which the peak frequency line width in less than about 1 GHz, such as less about 0.5 GHz. The high damping FGL 450 stabilizes the FGL 450 magnetization from the spin torque from the SPL 430 so the magnetization direction of the high damping FGL 450 oscillates coherently. Since the magnetization direction of the high damping FGL 450 oscillates coherently, the magnetic field signal linewidth is narrow and amplitude is higher than a FGL without very low damping.

Figure 5A:
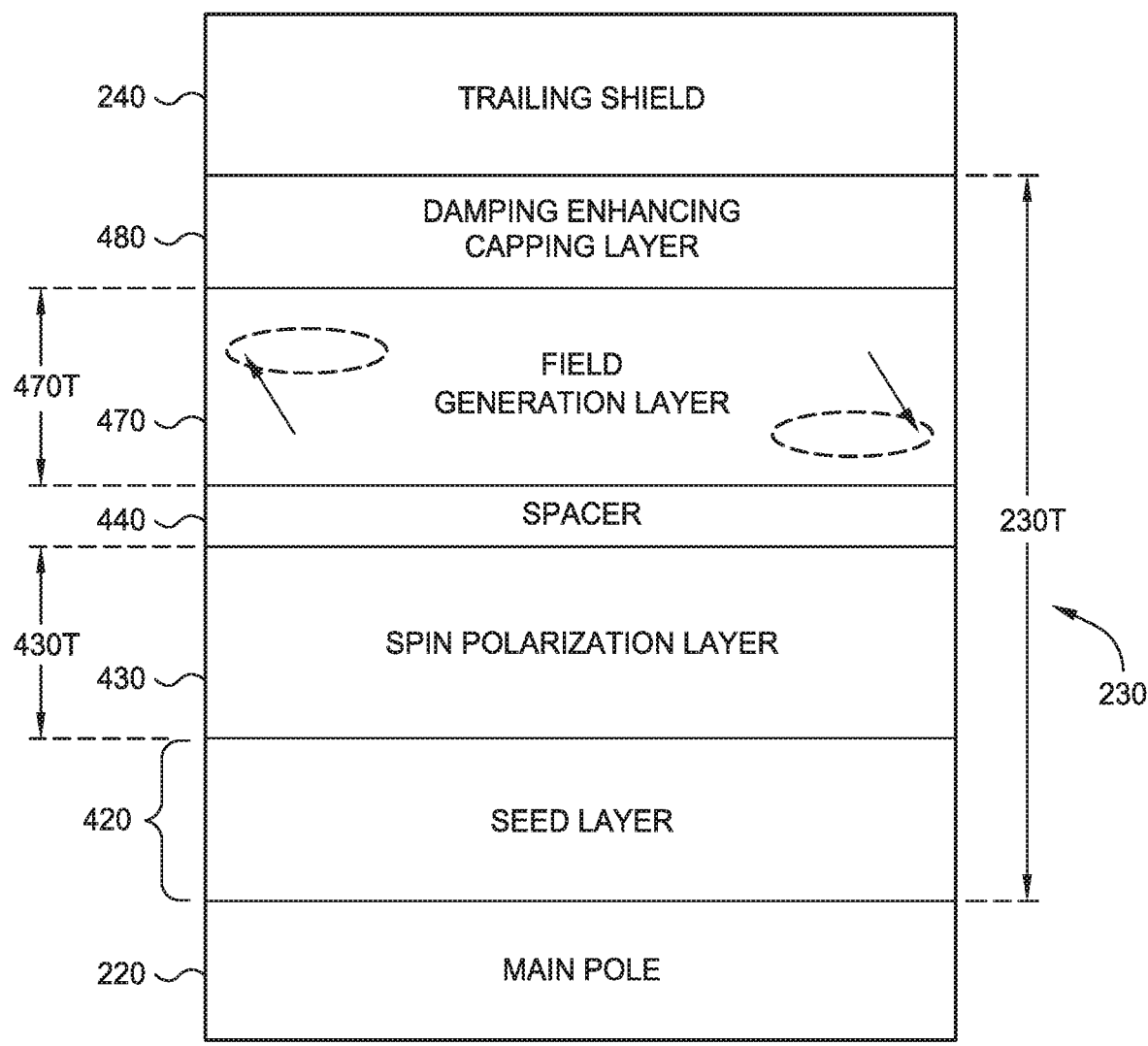
FIGS. 5A-C are schematic plan views of a media facing surface of certain embodiments of a STO device comprising a damping FGL and a damping enhancing capping layer.
Figure 5B:
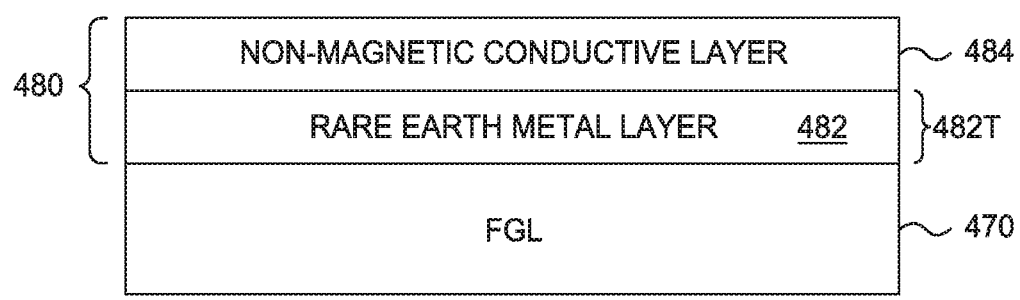
Figure 5C:
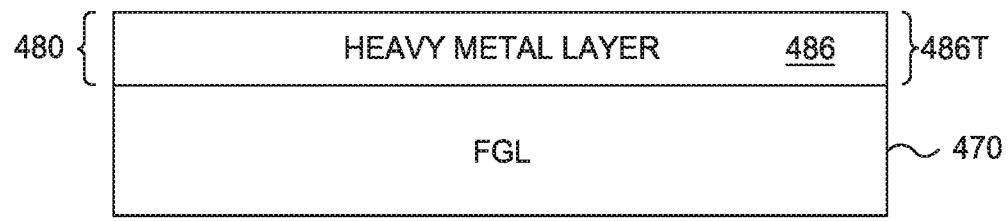

FIGS. 5A-C are schematic plan views of a media facing surface of certain embodiments of a STO device 230 comprising a FGL 470 and a damping enhancing capping layer 480. The damping enhancing capping layer is a non-magnetic layer that enhances the damping in the FGL 470. The STO device 230 may be part of write head 210 of FIG. 2, FIG. 3, and/or other MAMR write heads. The STO device 230 of FIG. 5A is similar to FIG. 4A and like numerals are used for ease of description.

As shown in FIG. 5A, the STO device 230 includes a seed layer 420 over or on the main pole 220, a spin polarization layer (SPL) 430 over or on the seed layer 420, a spacer layer 440 over or on the SPL 430, a high damping field generation layer (FGL) 470 over or on the spacer layer 440, and a damping enhancing capping layer 480 over or on the FGL 470 in certain embodiments. The damping enhancing capping layer 480 is between the FGL 470 and the trailing shield 240. The SPL 430 transmits spin torque to the FGL 470 causing oscillation of the magnetization of the FGL 470 at high velocity to thereby generate a high-frequency magnetic field, such as a microwave field.

The FGL 470 has a Gilbert damping coefficient α (referred to herein as "damping") in a range from about 0.5% to about 20%, such as in a range from 1.5% to about 10%. A FGL having a damping of less than 0.5% is undesirable since magnetization of the FGL may not oscillate coherently with a low or undetectable amplitude of oscillation, especially when the SPL layer is thicker. The FGL may oscillate in multiple domains, random domains, or may not oscillate at all. A FGL having a damping of more than 20% is undesirable since increased bias voltage is required to cause oscillation of the magnetization of the FGL.

The damping in a magnetic system (a thin film, multilayer stack, or structure device) in a physical property of the magnetic system. The damping in the FGL 470 with a damping enhancing capping layer 480 of the STO device 230 is determined by isolating the FGL and the capping layer or by creating a like sample of the FGL and capping layer and measuring by using a ferromagnetic resonance (FMR) measurement of the damping in the isolated FGL and camping layer or the like sample of the FGL and the capping layer. FMR measurements were conducted at 20° C. utilizing a PhaseFMR tool available from NanOsc Instruments AB located in Kista, Sweden.

In certain embodiments, the FGL 470 comprises a high damping magnetic alloy layer. The high damping magnetic alloy layer comprises a magnetic material doped with a rare earth metal or a heavy metal. Magnetic materials include Fe, Co, FeCo, NiFe, CoFeAl, CoFeGe, CoMnGe, CoFeSi, CoMnSi, and other magnetic materials.

Rare earth metals include holmium (Ho), dysprosium (Dy), terbium (Tb), samarium (Sm), other rare earth metals, and combinations thereof. Particular examples of a high damping magnetic alloy layer with a rare earth metal include FeCoHo, FeCoDy, FeCoTb, and FeCoSm. In certain embodiments, the damping enhancing capping layer 480 enables a smaller percent content of rare earth metal doped in the FGL 470.

Heavy metals include Pt, Pd, Ir, Rh, Ru, Re, Os, Ta, Hf, other heavy metals, or combinations thereof. Particular examples of a high damping magnetic alloy layer with a heavy metal include FeCoIr, FeCoOs, FeCoPt and FeCoPd. It is believed that a heavy metal layer 486 of Os has a higher damping enhancing effect in the FGL than a heavy metal layer 486 of Ir, Pt, Pd, Ta, Hf, which all have a similar damping enhancing effect The heavy metal content does not increase the susceptibility of the FGL 470 to corrosion. In certain embodiments, the damping enhancing capping layer 480 enables a smaller percent content of heavy metal doped in the FGL 470.

In certain embodiments, the FGL 470 comprises a multi-layer structure comprising one or more magnetic alloy layers and one or more rare earth metal layers. A rare earth metal layer comprises holmium (Ho), dysprosium (Dy), terbium (Tb) samarium (Sm), other rare earth metals, or combinations thereof. In certain embodiments, the rare earth metal layer comprises an atomic percent content of a rare earth metal in a range from about 95% to 100%, such as about 99% to 100%.

In certain embodiments, the FGL 470 comprises a multi-layer structure comprising one or more magnetic alloy layer and one or more heavy metal layers. A heavy metal layer comprises Pt, Pd, Ir, Rh, Ru, Re, Os, Ta, Hf, other heavy metals, or combinations thereof. In certain embodiments, a heavy metal layer comprises an atomic percent content of a heavy metal in a range from about 95% to 100%, such as about 99% to 100%.

In certain embodiments, the FGL 470 (a high damping magnetic alloy layer or a multi-layer structure) with a damping enhancing capping layer thereon comprises a total atomic percent content of a rare earth metal of 0% (i.e., no rare earth metal content) or in a range of less than 6% to achieve a damping in a range from about 0.5% to about 20%, such as about 1.5% to about 10%. In certain embodiments, the FGL 470 (a high damping magnetic alloy layer or a multi-layer structure) with a damping enhancing capping layer thereon comprises an atomic percent content of a heavy metal of 0% (i.e., no heavy metal content) or in a range of less than 12% to achieve a damping in a range from about 0.5% to about 20%, such as about 1.5% to about 10%.

As shown in FIG. 5B, in certain embodiments, the damping enhancing capping layer 480 may comprise a rare earth metal layer 482 on the FGL 470. The rare earth metal layer 482 comprises a rare earth metal. Examples of rare earth metal include holmium (Ho), dysprosium (Dy), terbium (Tb), samarium (Sm), other rare earth metals, or combinations thereof. In certain embodiments, the rare earth metal layer 482 comprises an atomic percent content of a rare earth metal in a range from about 95% to 100%, such as about 99% to 100%. In certain embodiments, the rare earth metal layer 482 is formed to at thickness 482T of about 15 Å or less, such as about 10 Å or less, to provide low resistivity. A thin rare earth metal layer 482 is used to improve the damping constant of the high FGL layer 470 with minimal resistivity and minimal corrosion sensitivity. The damping enhancing capping layer 480 may further comprise a non-magnetic conductive layer 484 over the rare earth metal layer 482 to reduce capping layer resistivity and improve corrosion robustness of the damping enhancing capping layer 480. Examples of a non-magnetic conductive layer 484 comprises NiCr, Cr, Pt, Ir, Ta, Ru, other non-magnetic conductive materials, alloys thereof, or multiple layers thereof.

As shown in FIG. 5C, in certain embodiments, the damping enhancing capping layer 480 may comprise a heavy metal layer 486 on the FGL 470. The heavy metal layer 486 comprises Pt, Pd, Ir, Rh, Ru, Re, Os, Ta, Hf, other heavy metals, or combinations thereof. In certain embodiments, a heavy metal layer 486 comprises an atomic percent content of a heavy metal in a range from about 95% to 100%, such as about 99% to 100%. In certain embodiments, the heavy metal layer 486 is formed to a thickness 486T in of about 5 Å or more. A heavy metal layer 486 is used to improve the damping constant of the high FGL layer 470 with low resistivity and low corrosion potential. The damping enhancing capping layer 480 may further include one or more additional layers over the heavy metal layer 486.

Spin torque transmitted from the SPL 430 to the FGL 470 of FIGS. 5A-5C results in oscillation of the magnetization of the FGL 470 generating a high-frequency magnetic field, such as a microwave field.

When an electron current flows through the STO device 230 through the SPL 430, the electrons passing through the SPL 430 are polarized. The stream of polarized electrons from the SPL 430 to the FGL 470 imparts a spin torque to the FGL 470 causing the FGL 470 to emit a high-frequency magnetic field to the magnetic recording medium reducing the coercive force of the recording medium and reducing the switch field threshold. The recording magnetic field applied from the main pole 220 to the STO device 230 influences the magnetization direction of the SPL 430 and the FGL 470 so that the FGL 470 can oscillate to produce a microwave field. The magnetization direction of the SPL 430 and the FGL 470 can be the same or can be different depending on the STO device. The magnetization direction of the FGL 470 is reversed depending on the magnetization direction of the recording magnetic field. Reversal of the FGL 470 establishes a consistent microwave field to the magnetic recording medium.

Damping in the FGL 470 is a result of the material composition of the FGL 470 in combination with the damping enhancing capping layer 480 of FIG. 5A-5C. A damping enhancing capping layer 480 allows none or less atomic percent content of a rare earth metal and/or heavy metal in the FGL 470 in comparison to the high damping FGL 450 of FIG. 4 without a damping enhancing capping layer. In certain embodiments, a FGL 470 with a damping enhancing capping layer 480 can have a higher magnetic moment (Bs) than a high damping FGL without such a damping enhancing capping layer due to no or lower rare earth metal of the FGL 470 of FIGS. 5A-5C in comparison to the high damping FGL 450 of FIGS. 4A-4D. The heavy metal content in the FGL has a small impact to the magnetic moment (Bs) of the FGL 470.

In certain embodiments, oscillation of the magnetization of the FGL 470 in combination with the damping enhancing capping layer 480 from the spin torque from the SPL 430 is more coherent. The oscillation frequencies of the spectrum of the magnetic field emitted from the FGL 470 forms a sharp peak that is easy to detect. A sharp peak is defined in which the peak frequency line width in less than about 1 GHz, such as less about 0.5 GHz. The FGL 470 in combination with the damping enhancing capping layer 480 stabilizes the FGL 470 magnetization from the spin torque from the SPL 430 so the magnetization direction of the FGL 470 oscillates coherently. Since the magnetization direction of the FGL 470 oscillates coherently, the magnetic field signal linewidth is narrow and amplitude is higher than a FGL without very low or no damping and/or without a damping enhancing capping layer 480.

Figure 6:
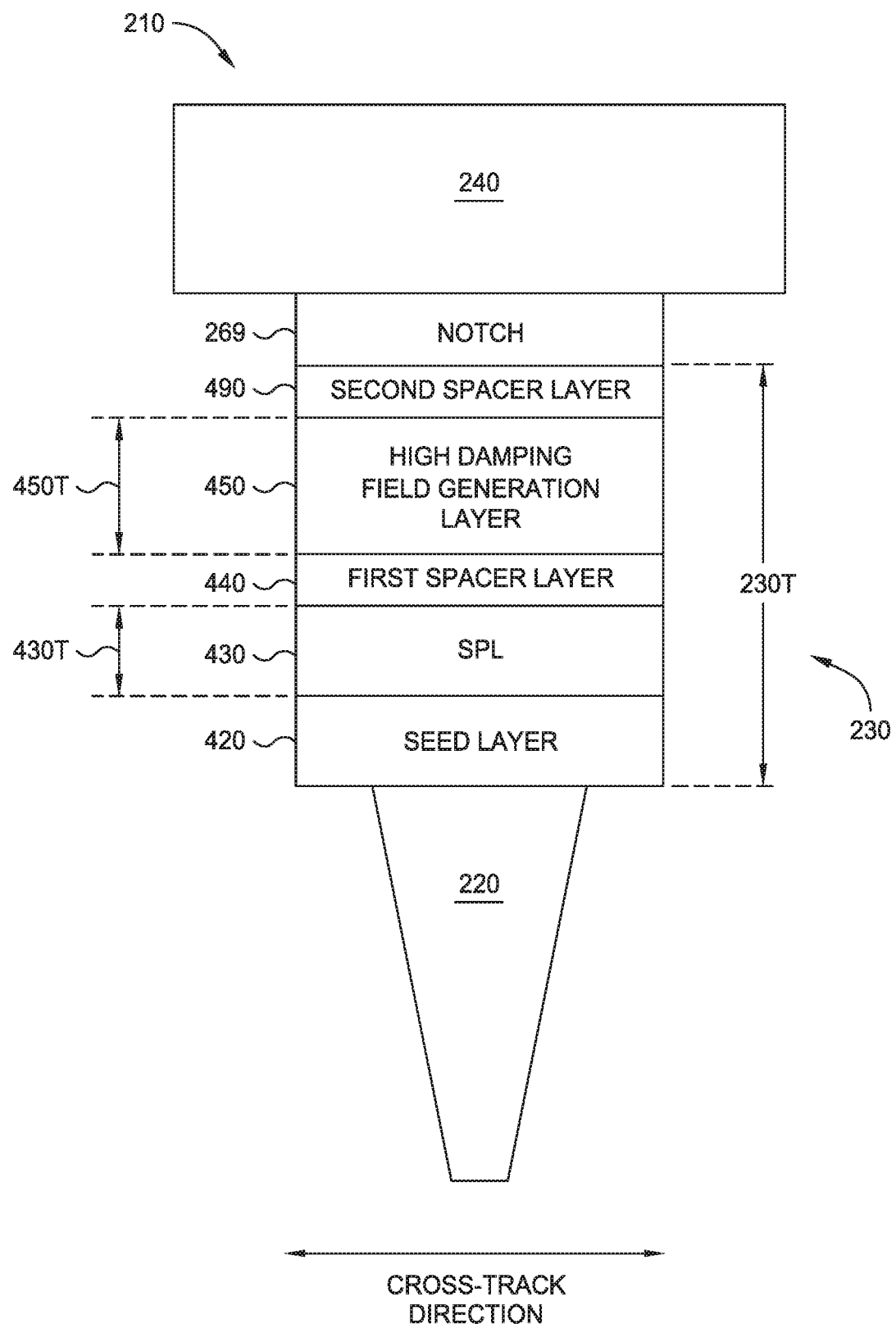
FIG. 6 is a schematic plan view of a media facing surface of certain embodiments of a STO device between a main pole and a notch of a trailing shield.

FIG. 6 is a schematic plan view of a media facing surface of certain embodiments of a STO device 230 between a main pole 220 and a notch 269 of a trailing shield 240. The STO device 230 may be part of write head 210 of FIG. 2, FIG. 3, and or other MAMR write heads. The STO device 230 of FIG. 6 is similar to FIG. 4 and like numerals are used for ease of description.

The STO device 230 is formed between the main pole 220 and the notch 269 of the trailing shield 240. The high damping FGL 450 is provided spin torque from the SPL 430 with additional spin torque from the notch 269. Since the high damping FGL 450 is relatively stable, the additional spin torque from the notch 269 assist in oscillation of the high damping FGL 450 to higher frequency or to the same frequency using lower bias current. A lower bias current to the STO device 230 provides increased reliability due to less joule heating of the STO device 230.

In certain embodiments, the STO device 230 includes a seed layer 420 over or on the main pole 220, a spin polarization layer (SPL) 430 over or on the seed layer 420, a spacer layer 440 over or on the SPL 430, a high damping field generation layer (FGL) 450 over or on the spacer layer 440, and a second spacer layer 490 over or on the high damping FGL 450. The second spacer layer 490 is between the high damping FGL 450 and the notch 269 of the trailing shield 240.

Similar to FIG. 4, a first spacer layer 440 and the second spacer layer 490 may each include one or more non-magnetic conductive materials, such as Au, Ag, Cu, AgSn, NiAl, other non-magnetic conductive materials, alloys thereof, or multiple layers thereof. The first spacer layer 440 and the second spacer layer 490 reduce exchange coupling of the high damping FGL 450 from the SPL 430 and the notch 269. The first spacer layer 440 and second spacer layer 490 are each made of a material having a long spin diffusion length for spin torque transfer from the SPL 430 and from the notch 269 to the FGL 450.

Similar to FIGS. 4A-D, the high damping FGL 450 of FIG. 6 may be one or more high damping magnetic alloy layers 452, one or more magnetic alloy layers 455 and one or more metal rare earth metal layers 456, one or more magnetic alloy layers 455 and one or more metal rare earth metal layers 456, one or more magnetic alloy layers 455 and one or more heavy metal layers 459, or combinations thereof. For example, the high damping FGL 450 may be a multi-layer structure comprising one more high damping magnetic alloy layers 452, one or more magnetic alloy layers 455, one or more metal rare earth metal layers 456, and/or one or more heavy metal layers 459.

Spin torque transmitted from the SPL 430 and from the notch 269 to the high damping FGL 450 of FIG. 6 increases the disturbance to the high damping FGL 450. Without high damping of the FGL, there is a high likelihood that the FGL randomly oscillates. In certain embodiments, the high damping FGL 450 provides coherent oscillation with high amplitude under the spin torque from the SPL 430 and the notch 269.

Although the layers of the STO devices 230 of FIGS. 4-6 have been described as formed over the main pole 220, this description includes the embodiments where the STO device 230 is formed over the trailing shield 240. The layers of the STO devices 230 are deposited by any suitable deposition process, such as physical vapor deposition, electrodeposition, evaporation, chemical vapor deposition, atomic layer deposition, other suitable deposition processes, or combinations thereof.

Figure 7:
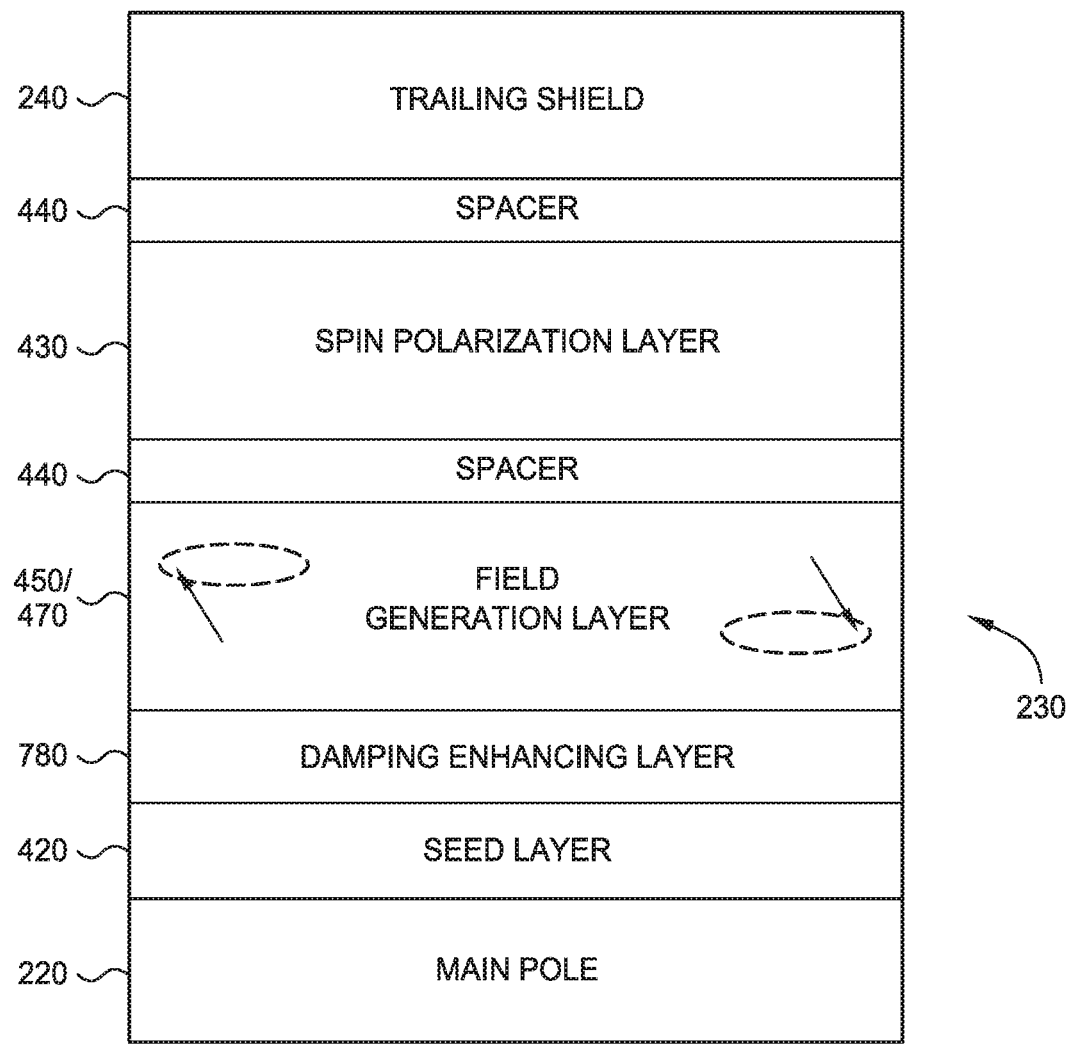
FIG. 7 is a schematic plan view of a media facing surface of certain embodiments of a STO device in a reverse configuration between a main pole and a trailing shield.

FIG. 7 is a schematic plan view of a media facing surface of certain embodiments of a STO device 230 in a reverse configuration between a main pole 220 and a trailing shield 240. The STO device 230 may be part of write head 210 of FIG. 2, FIG. 3, and or other MAMR write heads. The STO device 230 is similar to the STO devices 230 of FIGS. 4A-D, FIGS. 5A-C, and FIG. 6 and like numerals are used for ease of description. The STO device 230 of FIG. 7 comprises a FGL 450/470 proximate the main pole 220 and a SPL 430 proximate the trailing shield 240. The STO device 230 of FIG. 7 may further including a damping enhancing layer 780 enhancing the damping in the FGL 470. The damping enhancing layer 780 may comprise a rare earth metal layer 482 or a heavy metal layer 486 in contact with the high damping layer 470.

In certain embodiments, the STO devices 230 of FIGS. 4-7 and variations thereof increases detectability of oscillation of the STO device 230 and formation of a stable microwave field. The assisting microwave field generated under a bias current to the STO devices 230 can be measured with a microwave meter. During production of STO devices for MAMR write heads, STO devices are screened to determine yield. If oscillation of the STO devices cannot be detected in a consistent and reliable way, production yield prediction will be impacted. The cost of write head performance screening by other methods and/or at other manufacturing stages is expensive.

Wafer-to-wafer variation or substrate-to-substrate variation is present in the manufacturing of STO device. For example, patterning and lithography techniques in the formation of STO devices has an error rate of ±2 nm which is in the order of magnitude of the deposited layers of the STO device. Therefore, the variation in manufactured STO devices is large.

In certain embodiments, the bias voltage in a millivolts (mV) range applied to a STO device 230 produces an amplitude signal of the microwave field in a microvolts (pV) range. A signal of amplitude of 0.5 uV or less may be difficult to detect since the signal-to-noise ratio may be too low. In certain embodiments, adding rare earth metals and/or heavy metals to the FGL increases oscillation signal amplitude by a factor of two or more times. The bias voltage applied to the STO device can be raised to increase the signal-to-noise ratio, but raising the bias voltage may increase joule heating of the STO device and may cause reliability issues to the STO device.

Detecting oscillation of the STO device 230 is useful in determining one or more of the following attributes of the STO device: (a) determining that the STO device is producing a targeted oscillation frequency, (b) determining the bias voltage range for oscillation, (c) determining the approximate STO oscillation angle, (d) determining the quality of FGL oscillation, and/or (e) other attributes.

The frequency of oscillation of the STO device 230 can be tuned or matched to the ferromagnetic resonance of the recording medium. The frequency of oscillation of the STO device 230 can be tuned by changing the magnitude of the external applied magnetic field.

Coherent oscillation with a sharp FMR amplitude means stable FGL and SPL oscillation. In certain embodiments, a STO device 230 including a high damping FGL 450 or a FGL 470 with a damping enhancing capping layer 480 oscillates coherently. Coherent oscillation indicates that the bias voltage applied to the STO device 230 generates a stable rotating field to the recording medium. A stable coherent oscillation may indicate effective oscillation frequency with narrow frequency range and oscillation angle.

In certain embodiments, determining the one or more attributes of the STO device 230 will enable effectively screening of STO devices (such as effectively approving properly working STO devices and/or avoiding improperly rejecting working STO devices) and/or will lower the error rate during operation of the MAMR write heads. The STO devices 230 from a manufacturing lot can be sampled or can be all tested to provide quality control. Detecting a microwave field can be directly correlated to a yield and operation range of the STO device 230.

The oscillation signal of STO devices with a FGL without damping may be difficult to detect due to one or more of the following factors: (a) the amplitude of the oscillation signal may be less than 0.5 microvolts or too low to detect, (b) the STO device is oscillating in a broad frequency peak indicating chaotic oscillation, (c) the STO device is oscillating in multiple domains, (d) the STO device is defective with no oscillation, and/or (e) other factors. If the oscillation signal of the STO devices is difficult to detect, frequency of oscillation of the STO device cannot be tuned or matched.

In certain embodiments, STO devices 230 of FIG. 4-7 and variations thereof can be made with a track width 230W (of FIG. 3) at a media facing surface at any suitable width, such as about 30 nm or larger, about 40 nm or larger, or about 55 nm or larger. For dimensions of greater than about 30 nm without a high damping FGL 450 or without a high damping enhancing layer 480, oscillation may not be uniform and may break into multiple domains (i.e., there is no uniform or coherent oscillation). Coherent oscillation without a high damping FGL 450 or without a high damping enhancing layer 480 primarily occurs on very small device dimensions with a track width 230W less than 30 nm. Patterning processes are hard to control in the nanometer range, especially over slopped/tapered main poles.

Coherent oscillation about a single frequency or narrow frequency band allows frequency matching and tailoring the desired frequency based upon the STO device materials, the bias voltage to the STO device, and the external write field. If there are multiple oscillation modes or random oscillation modes, frequency matching is difficult or impossible.

The larger the dimensions of the high damping FGL 450 or of the FGL 470 with a high damping enhancing layer 480 and the STO device 230 the greater amount of assisting microwave field is produced. The assisting microwave field strength is proportional to volume of the FGL and its oscillation range. If the thickness 450T, 470T of the high damping FGL 450 or the FGL 470 and/or STO device 230 dimension at a media facing surface is large, then the volume of the FGL and the amount of assisting microwave field produced is large. In certain embodiments, the high damping FGL 450 or the FGL 470 has a thickness 450T, 470T at a media facing surface of about 5 nm or more. In certain embodiments, the high damping FGL 450 or the FGL 470 has a magnetic moment of about 1.7T or greater, such as about 2.0T or greater, or such as about 2.2T or greater.

However, if the thickness of the FGL and/or STO device is large, oscillation may occur in multiple domains or in random domains with low intensity/amplitude of oscillation without a high damping FGL 450 or without a high damping enhancing layer 480. Such oscillation may be difficult to detect or may be difficult to consistently detect. Therefore, STO devices without a high damping FGL 450 or without a high damping enhancing layer 480 have been limited to small dimensions with a thickness 230T of less than 30 nm at a media facing surface.

With a SPL 430 with a greater thickness 430T or higher saturation flux density (Bst), more spin torque is injected into the high damping FGL 450 or the FGL 470. However, other SPLs without relative high damping in the FGL have been limited to a low saturation flux density (Bst) of less than 2 nmT since a high Bst will cause multiple oscillation domains of the FGL without higher damping. A high damping FGL 450 or a FGL 470 in combination with a damping enhancing capping layer 480 enables use of a SPL 430 with higher saturation flux density (Bst). In certain embodiments, the SPL 430 has a saturation flux density (Bst) of about 2.0 nmT or more, such about 2.5 nmT or more.

EXAMPLES

The following are examples to illustrate various embodiments of a STO device 230 and variations thereof. For illustration purposes, these examples will be described in reference to the STO device 230 described in FIGS. 4A-D, FIGS. 5A-5C, FIG. 6, and FIG. 7. The FGL of the following examples were formed to a thickness of about 5 nm, unless otherwise noted. These examples are not meant to limit the scope of the claims unless specifically recited in the claims.

Example 1

A high damping FGL 450 comprising a high damping magnetic alloy layer 452 of FeCoHo containing about 0.5% atomic percent content of Ho has a damping of about 2% at a FeCoHo. A high damping FGL 450 comprising a high damping magnetic alloy layer 452 of FeCoHo containing an atomic percent content of Ho in a range from about 4% to about 6% has a damping in a range from about 6.4% to about 8%.

Example 2

A high damping FGL 450 comprising a high damping magnetic alloy layer 452 of FeCoDy containing about 0.5% atomic percent content of Dy has a damping of about 2%. A high damping FGL 450 comprising a high damping magnetic alloy layer 452 of FeCoDy containing about 1% atomic percent content Dy has a damping of about 4%. A high damping FGL 450 comprising a high damping magnetic alloy layer 452 of FeCoDy containing a 2% atomic percent of Dy has damping constant of about 12%.

Example 3

A high damping FGL 450 comprising a high damping magnetic alloy layer 452 of FeCoIr containing about 2% atomic percent content of Ir has a damping of about 2.5%. A high damping FGL 450 comprising a high damping magnetic alloy layer 452 of FeCoIr containing about 6% atomic percent Ir has a damping of about 7.5%.

Example 4

A high damping FGL 450 comprising a multi-layer structure 454 comprising one or more FeCo layers and one or more Dy or Ho layers in which the multi-layer structure 454 comprises a total atomic percent content of about 0.5% Dy or Ho has a damping in a range from about 2% to about 2.5%. A high damping FGL 450 comprising a multi-layer structure 454 comprising one or more FeCo layers and one or more Dy or Ho layers in which the multi-layer structure 454 comprises a total atomic percent content of about 6% Dy or Ho has a damping in a range from about 6.4% to about 8%.

Example 5

A high damping FGL 450 comprising a multi-layer structure 458 comprising one or more FeCo layers and one or more Ir layers in which the multi-layer structure 458 comprises a total atomic percent connect of about 2% Ir has a damping of about 2.5%. A high damping FGL 450 comprising a multi-layer structure 458 comprising one or more FeCo layers and one or more Ir layers in which the multi-layer structure 458 comprises a total atomic percent connect of about 6% Ir has a damping of about 7.5%.

Example 6

A bias voltage of 15 mV with various external magnetic fields from 6 kOe to 16 kOe at an angle of larger than 6 degrees was applied to Sample A of an STO device comprising a FGL of FeCo.

A bias voltage of 22 mV with various external magnetic fields from 6 kOe to 16 kOe at an angle of larger than 5 degrees was applied to Sample B of an STO device comprising a FGL of FeCoHo with an atomic percent content of Co of about 29% and an atomic percent content of Ho in a range from about 0.3% to about 0.6%. The FGL was deposited by physical vapor deposition with a FeCoHo target comprising Ho in an atomic percent content of 1%.

The oscillation intensities of Sample A and Sample B was measured and set forth in TABLE 1.

TABLE 1

| | Sample A | | Sample B | |
|---|---|---|---|---|
| Field (kOe) | Peak | Height (uV) | Peak | Height (uV) |
| 9 | single broad | 0.4 | single sharp | 1.4 |
| 10 | single broad | 0.4 | single sharp | 1.6 |
| 11 | single sharp | 0.8 | single sharp | 3.3 |
| 12 | single sharp | 1.4 | single sharp | 3.0 |
| 13 | single broad | 0.2 | single sharp | 2.9 |
| 14 | single broad | 0.2 | single sharp | 2.7 |
| 15 | multiple | multiple | single sharp | 0.8 |
| 16 | single broad | 0.2 | single sharp | 0.8 |

Sample A exhibited oscillation with peak heights/sizes ranging from about 0.4 microvolts to 1.4 microvolts above a baseline noise level with frequencies in a range from 5 to 25 GHz.

Sample B exhibited a single sharp peak oscillation with peak heights/sizes ranging from about 0.8 microvolts to 3.3 microvolts above a baseline noise level with frequencies in a range from 12 to 24 GHz.

The amplitude of oscillation of Sample B is in the range of about 2 to about 15 times higher than Sample A. The oscillation of Sample B was coherent whereas the oscillation of Sample A was in a broad peak or multiple peak under certain external magnetic fields.

Example 7

Various bias voltages with external magnetic field of 16 kOe at an angle of 12 degrees were applied to Sample C, Sample D, and Sample E. Sample C was a STO device comprising a SPL with a Bst of 2.7 nmT and a FGL of FeCoHo with an atomic percent content of Ho of about 6%. The damping of the FGL of Sample C was about 7% as measured by FMR. Sample D was a STO device comprising a SPL with a Bst of 2.7 nmT and a FeCoHo with an atomic percent content of Ho of about 4%. The damping of the FGL of Sample D was about 5% as measured by FMR. Sample E was a STO device comprising a SPL with a Bst of 2.7 nmT and a FGL of FeCoHo with an atomic percent content of Ho of about 0.3%. The damping of the FGL of Sample E was about 1.8% as measured by FMR.

The oscillation intensities of Sample C, Sample, D, and Sample E were measured and set forth in TABLE 2.

TABLE 2

| Bias V (mV) | Sample C Oscillation Mode | Sample D Oscillation Mode | Sample E Oscillation Mode |
|---|---|---|---|
| 43 | single sharp | single sharp | random |
| 50 | single sharp | multiple | random |
| 56 | single sharp | multiple | random |
| 63 | single sharp | multiple | random |
| 70 | single sharp | multiple | random |
| 77 | single sharp | multiple | random |
| 84 | single sharp | multiple | random |

The oscillation of Sample C was coherent. The oscillation of Sample D was mostly in multiple domains. The oscillation of Sample E was all in random oscillation.

Example 8

Various bias voltages ranging from 15 mV to 85 mV was applied to Sample G, Sample H, Sample I, and Sample J. Sample G was a FGL of FeCo formed to a thickness of about 5 nm at a media facing surface. Sample H was a FGL of FeCoHo formed to a thickness of about 5 nm at a media facing surface with about 2% damping and about 0.5% atomic percent content of Ho. Sample I was a FGL of FeCo formed to a thickness of about 8 nm at a media facing surface. Sample J was a FGL of FeCoHo formed to a thickness of about 8 nm at a media facing surface with about 2% damping and about 0.5% atomic percent content of Ho.

The oscillation intensities of Sample G, Sample, H, Sample I, and Sample J were measured. The sum of oscillation intensities from highest to lowest was Sample J>Sample H>Sample I>Sample G. Increasing the thickness of the FGL increased the summed oscillation intensities over all frequencies. Increasing the damping of the FGL increased the summed oscillation intensities over all frequencies.

In one embodiment, a STO device for a MAMR write head includes a spin polarization layer, a spacer layer over the spin polarization layer, and a field generation layer over the spacer layer. The field generation layer has a damping in a range from about 0.5% to about 20%.

In another embodiment, a STO device for a MAMR write head includes a spin polarization layer over the seed layer, a spacer layer over the spin polarization layer, and a field generation layer over the spacer layer. The field generation layer includes one or more magnetic layers along with one or more rare earth metal layers or one or more heavy metal layers. The field generation layer has a damping in a range from about 0.5% to about 20%.

In still another embodiment, a STO device for a MAMR write head includes a spin polarization layer, a spacer layer over the spin polarization layer, a field generation layer over the spacer layer. The field generation layer may be a high damping magnetic alloy layer, a high damping multi-layer structure, or combinations thereof. A damping enhancing capping layer is on the field generation layer. The field generation layer has a damping in a range from about 0.5% to about 20%.

In still yet another embodiment, a STO device for a MAMR write head includes a spin polarization layer means for imparting a spin torque and a field generation means generating a high-frequency magnetic field. The field generation means has a damping in a range from about 0.5% to about 20%.

While the foregoing is directed to embodiments of the present disclosure, other and further embodiments of the disclosure may be devised without departing from the basic scope thereof, and the scope thereof is determined by the claims that follow.

What is claimed is:

1. A spin torque oscillator (STO) device for a microwave assisted magnetic recording (MAMR) write head, comprising:
    a spin polarization layer;
    a spacer layer over the spin polarization layer; and
    a field generation layer over the spacer layer, the field generation layer having a damping in a range from about 0.5% to about 20%, wherein the field generation layer comprises a heavy metal in an atomic percent content in a range from about 2% to about 10% and a magnetic material.

2. The STO device of claim 1, wherein the heavy metal is a rare earth metal selected from a group consisting of holmium, dysprosium, terbium, samarium, and combinations thereof.

3. The STO device of claim 1, wherein the heavy metal is selected from a group consisting of platinum (Pt), palladium (Pd), iridium (Ir), rhodium (Rh), ruthenium (Ru), rhenium (Re), osmium (Os), tantalum (Ta), hafnium (Hf), and combinations thereof.

4. A disk drive comprising the STO device of claim 1.

5. The STO device of claim 1, further comprising a damping enhancing capping layer on the field generation layer.

6. The STO device of claim 5, wherein the damping enhancing capping layer comprises a non-magnetic material.

7. A spin torque oscillator (STO) device for a microwave assisted magnetic recording (MAMR) write head, comprising:
    a spin polarization layer over a seed layer;
    a spacer layer over the spin polarization layer; and
    a field generation layer over the spacer layer, the field generation layer comprising one or more magnetic layers and one or more layers selected from a group consisting of a rare earth metal layer and a heavy metal layer, the field generation layer having a damping in a range from about 0.5% to about 20%, wherein the one or more magnetic layers each comprises Fe, Co, FeCo, NiFe, CoFeAl, CoFeGe, CoMnGe, CoFeSi, CoMnSi, and combinations thereof.

8. The STO device of claim 7, wherein the one or more layers is one or more rare earth metal layers.

9. The STO device of claim 8, wherein the one or more rare earth metal layers each comprises a rare earth metal selected from a group consisting of holmium, dysprosium, terbium, samarium, and combinations thereof.

10. The STO device of claim 7, wherein the one or more layers is one or more heavy metal layers.

11. The STO device of claim 10, wherein the one or more heavy metal layers each comprises a heavy metal selected from a group consisting of Pt, Pd, Ir, Rh, Ru, Re, Os, Ta, Hf, and combinations thereof.

12. A disk drive comprising the STO device of claim 7.

13. A spin torque oscillator (STO) device for a microwave assisted magnetic recording (MAMR) write head, comprising:
    a spin polarization means for imparting a spin torque;
    a field generation means for generating a high-frequency magnetic field, the field generation means having a damping in a range from about 0.5% to about 20%; and
    a damping enhancing capping layer on the field generation means.

14. The STO device of claim 13, wherein the field generation means has a thickness of 5 nm or more at a media facing surface and the STO device has a track width of 30 nm or more at the media facing surface.

15. The STO device of claim 13, wherein the spin polarization means has a saturation flux density (Bst) of about 2.0 nmT or more at a media facing surface.

16. The STO device of claim 13, wherein the field generation means has a magnetic moment (Bs) of about 1.7T or greater.

17. A disk drive comprising the STO device of claim 13.

18. The STO device of claim 7, wherein the one or more magnetic layers and the one or more layers selected from the group consisting of the rare earth metal layer and the heavy metal layer form a multilayer structure, and wherein the multilayer structure has a total atomic percent content of rare earth metal between about 0.3% and 10%.

19. The STO device of claim 13, wherein the damping enhancing capping layer comprises a high damping magnetic alloy material.

20. The STO device of claim 13, wherein the damping enhancing capping layer comprises a magnetic material doped with a rare earth metal or a heavy metal.

* * * * *